(12) United States Patent
Hong

(10) Patent No.: US 10,803,353 B2
(45) Date of Patent: Oct. 13, 2020

(54) METHOD AND APPARATUS FOR ACQUIRING INFORMATION

(71) Applicant: Baidu Online Network Technology (Beijing) Co., Ltd., Beijing (CN)

(72) Inventor: Zhibin Hong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 6 days.

(21) Appl. No.: 16/131,790

(22) Filed: Sep. 14, 2018

(65) Prior Publication Data
US 2019/0205699 A1 Jul. 4, 2019

(30) Foreign Application Priority Data
Dec. 29, 2017 (CN) .......................... 2017 1 1476810

(51) Int. Cl.
*G06K 9/62* (2006.01)
*G06K 9/20* (2006.01)
*G06K 9/00* (2006.01)

(52) U.S. Cl.
CPC ....... *G06K 9/6256* (2013.01); *G06K 9/00268* (2013.01); *G06K 9/2018* (2013.01); *G06K 9/6262* (2013.01); *G06K 9/00255* (2013.01)

(58) Field of Classification Search
CPC ............. G06K 9/6256; G06K 9/00268; G06K 9/2018; G06K 9/6262; G06K 9/00255

USPC ......................................................... 382/159
See application file for complete search history.

(56) References Cited

U.S. PATENT DOCUMENTS

2010/0141770 A1* 6/2010 Gomi ...................... H04N 5/232
348/164
2018/0103903 A1* 4/2018 Tzvieli .................. G01J 5/0205

FOREIGN PATENT DOCUMENTS

WO WO-2019108170 A1 * 6/2019 ........... G06N 3/0472

* cited by examiner

*Primary Examiner* — Wednel Cadeau
(74) *Attorney, Agent, or Firm* — Nixon Peabody LLP

(57) ABSTRACT

A method and apparatus for acquiring information. A specific embodiment of the method includes: acquiring a to-be-processed near-infrared image and scenario information corresponding to the to-be-processed near-infrared image, the scenario information being used to represent a scenario of acquiring the to-be-processed near-infrared image; searching for a pre-trained near-infrared image recognition model corresponding to the scenario information, the near-infrared image recognition model being used to identify near-infrared feature information from the to-be-processed near-infrared image; and importing the to-be-processed near-infrared image into the near-infrared image recognition model to obtain the near-infrared feature information of the to-be-processed near-infrared image. This embodiment speeds up the acquisition of the near-infrared feature information and improves the accuracy and efficiency of acquiring the near-infrared feature information.

9 Claims, 5 Drawing Sheets

METHOD AND APPARATUS FOR ACQUIRING INFORMATION

CROSS-REFERENCE TO RELATED APPLICATIONS

This application claims priority to Chinese Patent Application No. 201711476810.4, filed with the State Intellectual Property Office of the People's Republic of China (SIPO) on Dec. 29, 2017, the content of which is incorporated herein by reference in its entirety.

TECHNICAL FIELD

Embodiments of the present disclosure relate to the field of computer technology, specifically relate to the field of image recognition technology, and more specifically relate to a method and apparatus for acquiring information.

BACKGROUND

Facial recognition technology is a computer application research technology, belonging to biometric feature recognition technology. The biological features of a biological individual can not only provide distinctions for the biological individual, but can also estimate the physical state of the biological individual. When performing facial recognition, a clear face image needs to be acquired first at sufficient light, and then data processing is performed on the face image.

SUMMARY

The objective of embodiments of the present disclosure is to provide a method and apparatus for acquiring information.

In a first aspect, the embodiments of the present disclosure provide a method for acquiring information, including: acquiring a to-be-processed near-infrared image and scenario information corresponding to the to-be-processed near-infrared image, the scenario information being used to represent a scenario of acquiring the to-be-processed near-infrared image; searching for a pre-trained near-infrared image recognition model corresponding to the scenario information, the near-infrared image recognition model being used to identify near-infrared feature information from the to-be-processed near-infrared image; and importing the to-be-processed near-infrared image into the near-infrared image recognition model to obtain the near-infrared feature information of the to-be-processed near-infrared image.

In some embodiments, the method further includes steps of constructing the near-infrared image recognition model, and the constructing the near-infrared image recognition model include: extracting a visible light image from a visible light image set, the visible light image including visible light feature information for describing a feature point on the visible light image; converting the visible light image and the visible light feature information into a corresponding near-infrared image and near-infrared feature information respectively; combining the near-infrared image and the near-infrared feature information into a near-infrared relation pair to obtain a set of near-infrared relation pairs corresponding to the visible light image set; and training, by using a machine learning method, with the near-infrared image in the near-infrared relation pair as an input, and the near-infrared feature information in the near-infrared relation pair as an output, to obtain the near-infrared image recognition model.

In some embodiments, the converting the visible light image and the visible light feature information into a corresponding near-infrared image and near-infrared feature information respectively, includes: determining, on the visible light image, a first feature point corresponding to the visible light feature information; converting the visible light image into the near-infrared image to obtain a second feature point corresponding to the first feature point; and determining corresponding feature information of the second feature point on the near-infrared image as near-infrared feature information of the near-infrared image, and the feature information including location and color.

In some embodiments, the converting the visible light image into the near-infrared image to obtain a second feature point corresponding to the first feature point, includes: setting a first marking point on the visible light image, the first marking point being used to mark a location of a first image contained in the visible light image; querying a second marking point on the near-infrared image corresponding to the first marking point, the second marking point being used to mark a location of a second image contained in the near-infrared image and corresponding to the first image; and obtaining the second feature point corresponding to the first feature point, in response to a location difference between the first marking point and the second marking point being less than a set threshold.

In some embodiments, the method further includes setting a color for the second feature point.

In a second aspect, the embodiments of the present disclosure provide an apparatus for acquiring information, including: an information receiving unit, configured to acquire a to-be-processed near-infrared image and scenario information corresponding to the to-be-processed near-infrared image, the scenario information being used to represent a scenario of acquiring the to-be-processed near-infrared image; a searching unit, configured to search for a pre-trained near-infrared image recognition model corresponding to the scenario information, the near-infrared image recognition model being used to identify near-infrared feature information from the to-be-processed near-infrared image; and an information acquisition unit, configured to import the to-be-processed near-infrared image into the near-infrared image recognition model to obtain the near-infrared feature information of the to-be-processed near-infrared image.

In some embodiments, the apparatus further includes a near-infrared image recognition model construction unit, configured to construct the near-infrared image recognition model, and the near-infrared image recognition model construction unit includes: an image extraction subunit, configured to extract a visible light image from a visible light image set, the visible light image including visible light feature information for describing a feature point on the visible light image; an image converting subunit, configured to convert the visible light image and the visible light feature information into a corresponding near-infrared image and near-infrared feature information respectively; a near-infrared relation pair acquisition subunit, configured to combine the near-infrared image and the near-infrared feature information into a near-infrared relation pair to obtain a set of near-infrared relation pairs corresponding to the visible light image set; and a near-infrared image recognition model construction subunit, configured to train, by using a machine learning method, with the near-infrared image in the near-infrared relation pair as an input, and the near-infrared feature information in the near-infrared relation pair as an output, to obtain the near-infrared image recognition model.

In some embodiments, the image converting subunit includes: a first feature point determination module, configured to determine, on the visible light image, a first feature point corresponding to the visible light feature information; a second feature point determination module, configured to convert the visible light image into the near-infrared image to obtain a second feature point corresponding to the first feature point; and a near-infrared feature information acquisition module, configured to determine corresponding feature information of the second feature point on the near-infrared image as near-infrared feature information of the near-infrared image, and the feature information including location and color.

In some embodiments, the second feature point determination module includes: a first marking point setting submodule, configured to set a first marking point on the visible light image, the first marking point being used to mark a location of a first image contained in the visible light image; a second marking point acquisition submodule, configured to query a second marking point on the near-infrared image corresponding to the first marking point, the second marking point being used to mark a location of a second image contained in the near-infrared image corresponding to the first image; and a second marking point determination submodule, configured to obtain the second feature point corresponding to the first feature point, in response to a location difference between the first marking point and the second marking point being less than a set threshold.

In some embodiments, the apparatus further includes a color setting unit, configured to set a color for the second feature point.

In a third aspect, the embodiments of the present disclosure provide a server, including: one or more processors; and a storage apparatus, for storing one or more programs, the one or more programs, when executed by the one or more processors, cause the one or more processors to implement the method for acquiring information according to the first aspect.

In a fourth aspect, the embodiments of the present disclosure provide a computer readable storage medium, storing a computer program thereon, the program, when executed by a processor, implements the method for acquiring information according to the first aspect.

The method and apparatus for acquiring information provided by the embodiments of the present disclosure, after acquiring a to-be-processed near-infrared image, directly imports the to-be-processed near-infrared image into a near-infrared image recognition model to obtain the near-infrared feature information, which speeds up the acquisition of the near-infrared feature information and improves the accuracy and efficiency in acquiring the near-infrared feature information.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
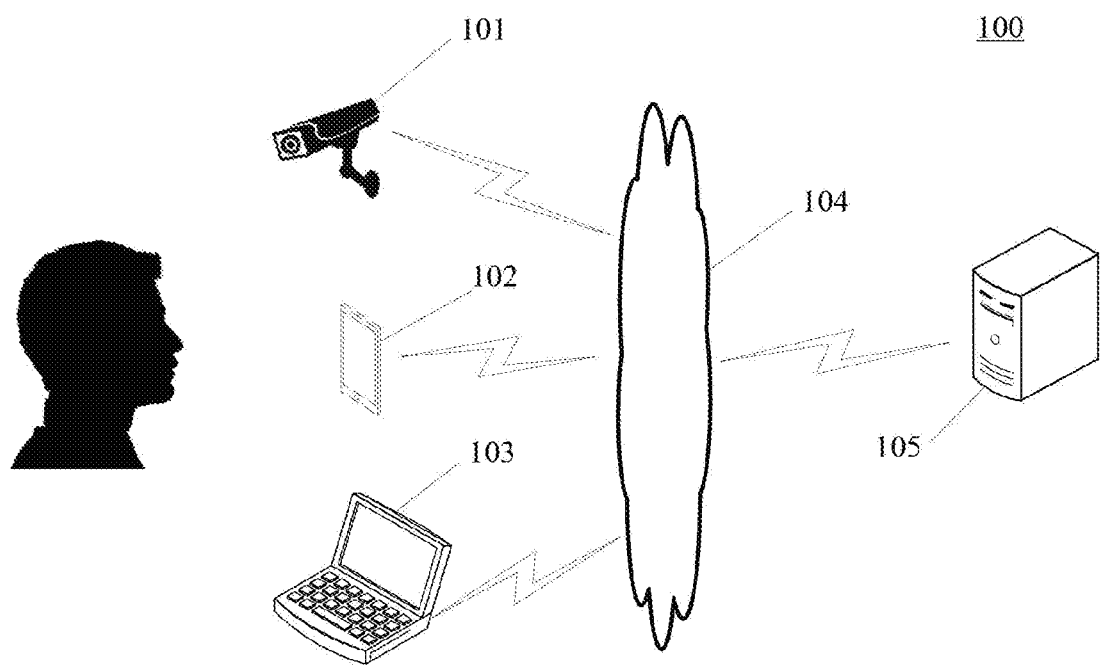
FIG. 1 is an exemplary system architecture diagram to which the present disclosure may be applied.

FIG. 1 shows an exemplary architecture of a system 100 in which a method for acquiring information or an apparatus for acquiring information according to the embodiments of the present disclosure.

The user 110 may use the terminal devices 101, 102 and 103 to interact with the server 105 through the network 104, in order to transmit or receive messages, etc. Various communication client applications, such as camera applications, video capture applications, image conversation applications, near-infrared image processing applications may be installed on the terminal devices 101, 102 and 103.

The terminal devices 101, 102 and 103 may be various electronic devices having display screen and supporting image capturing, including but not limited to, IP camera, surveillance camera, smart phones, tablet computers, laptop computers and desktop computers.

The server 105 may be a server providing various services, for example, a server performing the processing on the near-infrared image captured by the terminal devices 101, 102 or 103. The server may perform a data processing on the received near-infrared image, and return a processing result to the terminal devices 101/, 102 and 103.

It should be noted that the method for acquiring information according to the embodiments of the present disclosure may be executed by the terminal devices 101, 102 and 103 solely, or may be executed by the terminal devices 101, 102, 103 and the server 105 jointly. Accordingly, an apparatus for acquiring information may be installed on the terminal devices 101, 102 and 103, and may also be installed on the server 105.

It should be appreciated that the numbers of the terminal devices, the networks and the servers in FIG. 1 are merely illustrative. Any number of terminal devices, networks and servers may be provided based on the actual requirements.

Figure 2:
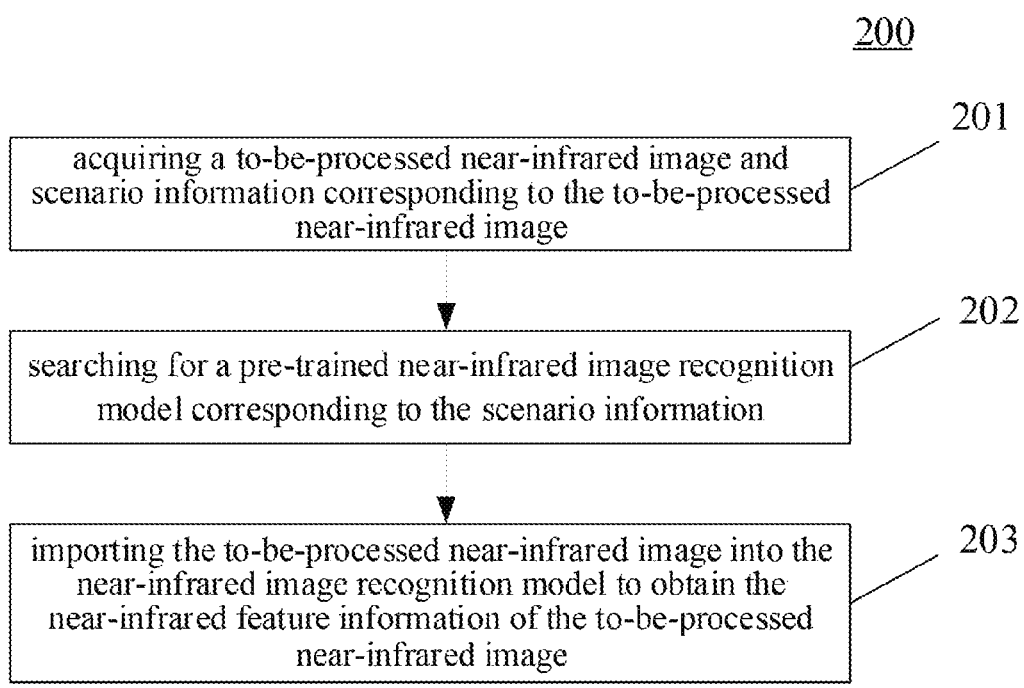
FIG. 2 is a flowchart of an embodiment of a method for acquiring information according to the present disclosure.

With further reference to FIG. 2, a flow 200 of an embodiment of the method for acquiring information according to the present disclosure is illustrated. The method for acquiring information includes the following steps:

Step 201, acquiring a to-be-processed near-infrared image and scenario information corresponding to the to-be-processed near-infrared image.

In the present embodiment, the electronic device (e.g., the terminal devices 101, 102, 103 as shown in FIG. 1) on which the method for acquiring information operate may acquire a to-be-processed near-infrared image and scenario information corresponding to the to-be-processed near-infrared image from a terminal used by a user for collecting images through a wired connection or a wireless connection. Here, the scenario information is used to represent a scenario of acquiring the to-be-processed near-infrared image. It should be noted that the wireless connection may include, but is not limited to, 3G/4G connection, WiFi connection, Bluetooth connection, WiMAX connection, Zigbee connection, UWB (ultra wideband) connection, and other wireless connections known by now or to be developed in the future.

Visible light is the part of the electromagnetic spectrum that may be perceived by eyes. Visible spectrum has no precise range. The wavelength of electromagnetic waves that may be perceived by ordinary one's eyes is between 400 and 760 nanometers, but some others can perceive electromagnetic waves with wavelengths between about 380 and 780 nanometers. The existing method is generally an image processing performed on an image acquired in a visible light environment (i.e., a visible light image). Therefore, eyes may directly observe the content of the image acquired in the visible light environment. However, in practice, many images acquired by the image acquisition device belong to the near-infrared image due to light (night or insufficient light) and other reasons. Near-infrared images may be images acquired in the near-infrared environment. Near Infrared (NIR) is an electromagnetic wave between visible light and mid-infrared light. According to the definition of the American Society for Testing and Materials Testing, Near Infrared refers to electromagnetic waves with a wavelength in the range of 780 to 2526 nanometers. It is customary to divide the near-infrared region into two regions: near-infrared short-wave (780-1100 nm) and near-infrared long-wave (1100-2526 nm). Near-infrared images generally cannot be image-processed directly by existing image processing methods. Therefore, useful information contained in near-infrared images may be lost. For example, in dim light or at night, a image of the driver driving a vehicle illegally captured by the surveillance camera is usually unable to be image-processed by the existing image processing method, and thus it is difficult to acquire face information of the driver through the acquired image. Therefore, the technical solution of the embodiment of the present disclosure may directly perform data processing on a near-infrared image (on the premise that the near-infrared image is not converted into a visible light image) to acquire related image information.

The above scenario information is used to represent a scenario of acquiring the to-be-processed near-infrared image. For example, when the to-be-processed near-infrared image is a near-infrared image of the driver's face acquired during the driving of the vehicle, the to-be-processed near-infrared image may be considered to be acquired under a fatigue monitoring scenario, and the scenario may be a fatigue monitoring scenario. When the to-be-processed near-infrared image is a near-infrared image of the user's face acquired when the face verification information is verified, the to-be-processed near-infrared image may be considered to be acquired under a facial recognition scenario, and the scenario may be a facial recognition scenario. Correspondingly, the scenario may also be determined by the terminal device that captures the to-be-processed near-infrared image. For example, if the terminal device that acquires the to-be-processed near-infrared image is a surveillance camera, and the surveillance camera is used to capture vehicle driving images at the intersection, the scenario of the to-be-processed near-infrared image may also be considered as a fatigue monitoring scenario; when the terminal device that acquires the to-be-processed near-infrared image captures images when the smart terminal interface is opened, the scenario of the to-be-processed near-infrared image may also be considered as a facial recognition scenario.

It should be noted that, besides the fatigue monitoring scenario and the facial recognition scenario described above, other scenarios may also be possible, specifically depending on actual needs.

Step 202, searching for a pre-trained near-infrared image recognition model corresponding to the scenario information.

It may be seen from the above description that the to-be-processed near-infrared image may be acquired in various scenarios. In different scenarios, the feature information of the acquired to-be-processed near-infrared image is also different. For example, in a fatigue monitoring scenario, a blink condition or a closed-eye condition of a face, or a hand motion in the to-be-processed near-infrared image may be acquired; and in a facial recognition scenario, a facial feature such as eyebrows, eyes, or nose of a face may be acquired. Therefore, after obtaining the scenario information corresponding to the to-be-processed near-infrared image, it is necessary to search for a pre-trained near-infrared image recognition model corresponding to the scenario information, to accurately acquire related information corresponding to the to-be-processed near-infrared image. That is, the near-infrared image recognition model may be used to identify a near-infrared feature information from the to-be-processed near-infrared image. The near-infrared image recognition model may be used to represent a matching relationship between the near-infrared image and the near-infrared feature information. As an example, the near-infrared image recognition model may be a matching relationship table pre-established by a technician based on statistics on a large amount of near-infrared images and near-infrared feature information, and storing a plurality of matching relationships between near-infrared images and near-infrared feature information, or may be a calculation formula for performing image processing on the near-infrared images to obtain a calculation result for representing the near-infrared feature information, the calculation formula may be preset and stored to the electronic device by the technician based on statistics on a large amount of data.

In some alternative implementations of the present embodiment, the method may further include constructing the near-infrared image recognition model, and the constructing the near-infrared image recognition model may include the following steps:

The first step: extracting a visible light image from a visible light image set.

Most of the existing image processing methods are used to process a visible light image. Since eyes may directly recognize information such as colors and lines from a visible light image, the visible light image becomes the most extensively used image in current image processing, and therefore, the number of visible light images is also massive. Although there are some image processing methods for non-visible light images, they are also image processing methods after converting non-visible light images into visible light images. In the process of image conversion, it is inevitable that conditions such as information loss or conversion inaccurate may occur. In addition, image conversion also requires the consumption of more time and processing capacity, resulting in longer image processing time.

To this end, the present disclosure may convert information in a visible light image into information of a corresponding near-infrared image. First, a visible light image is extracted from a visible light image set. Here, the visible light image includes a visible light feature information for describing a feature point on the visible light image, that is, the visible light image is previously marked with a visible light feature information, and the visible light feature information may be information such as location and color, depending on actual needs.

The second step, converting the visible light image and the visible light feature information into a corresponding near-infrared image and a near-infrared feature information respectively.

The mutual conversion between the visible light image and the near-infrared image may be achieved by image conversion. Correspondingly, the present disclosure may convert the visible light image and the visible light feature information into a corresponding near-infrared image and a near-infrared feature information, respectively.

The third step, combining the near-infrared image and the near-infrared feature information into a near-infrared relation pair to obtain a set of near-infrared relation pairs corresponding to the visible light image set.

When the visible light image and the visible light feature information are converted into the corresponding near-infrared image and the near-infrared feature information, since the visible light image and the visible light feature information have a corresponding relationship, the converted near-infrared image and the near-infrared feature information also have a corresponding relationship. Combining the near-infrared image and the near-infrared feature information corresponding to the near-infrared image into a near-infrared relation pair may obtain a set of near-infrared relation pairs corresponding to the visible light image set.

The fourth step, training, by using a machine learning method, with the near-infrared image in the near-infrared relation pair as an input, and the near-infrared feature information in the near-infrared relation pair as an output, to obtain the near-infrared image recognition model.

The electronic device of the present embodiment may train, by using a machine learning method, with the near-infrared image in the near-infrared relation pair as an input, and the near-infrared feature information in the near-infrared relation pair as an output, to obtain the near-infrared image recognition model. Specifically, the electronic device may use the near-infrared image in the near-infrared relation pair as the input of the model, the near-infrared feature information in the near-infrared relation pair as the output of the model by using a method such as dualgan or cyclegan, to train the model by using the machine learning method to obtain the near-infrared image recognition model.

In some alternative implementations of the present embodiment, the converting the visible light image and the visible light feature information into a corresponding near-infrared image and a near-infrared feature information respectively may include the following steps:

The first step, determining, on the visible light image, a first feature point corresponding to the visible light feature information.

The visible light feature information may be information such as location and color. In order to perform corresponding data processing on the visible light image, it is necessary to determine a first feature point corresponding to the visible light feature information. That is, the first feature point may be used to mark the visible light feature information.

The second step, converting the visible light image into the near-infrared image to obtain a second feature point corresponding to the first feature point.

After converting the visible light image into the near-infrared image, the near-infrared image also contains a second feature point corresponding to the first feature point on the visible light image. Since the first feature point corresponds to the visible light feature information, the second feature point also corresponds to the feature information on the near-infrared image corresponding to the visible light feature information.

The third step, determining corresponding feature information of the second feature point on the near-infrared image as near-infrared feature information of the near-infrared image.

The second feature point corresponds to the first feature point, and the first feature point corresponds to the visible light feature information, correspondingly, the second feature point corresponds to the near-infrared feature information. Therefore, the feature information on the near-infrared image corresponding to the second feature point may be used as the near-infrared feature information of the near-infrared image. Here, the feature information may include location, color, or other information.

In some alternative implementations of the present embodiment, the converting the visible light image into the near-infrared image to obtain a second feature point corresponding to the first feature point may include the following steps:

The first step, setting a first marking point on the visible light image.

In order to prevent the occurrence of a convergence failure when converting the visible light image into the near-infrared image, it is necessary to determine a first marking point corresponding to the visible light feature information. The first marking point of the present embodiment may be used to mark the location of a first image contained in the visible light image. That is, the first marking point may be used to define information such as the location or color of the first image during the image conversion process.

The second step, querying a second marking point on the near-infrared image corresponding to the first marking point.

Similar to the above obtaining second feature point, when the visible light image is converted into the near-infrared image, the second marking point corresponding to the first marking point may also be obtained. The second marking point is used to mark the location of a second image corresponding to the first image and contained in the near-infrared image.

The third step, obtaining the second feature point corresponding to the first feature point, in response to a location difference between the first marking point and the second marking point being less than a set threshold.

The first marking point may be used to define information such as the location or color of the first image. When the location difference between the first marking point and the second marking point is less than a set threshold, it means that after the visible light image is converted into the near-infrared image, the location of the second image of the first image is substantially not offset, and the deformation of the second image is small; it also means that the second feature point is corresponding to the first feature point, thereby ensuring that the near-infrared feature information also corresponds to the visible light feature information.

Step 203, importing the to-be-processed near-infrared image into the near-infrared image recognition model to obtain the near-infrared feature information of the to-be-processed near-infrared image.

It may be seen from the above that after the to-be-processed near-infrared image is imported into the near-infrared image recognition model of the present embodiment, the near-infrared image recognition model may output the near-infrared feature information of the to-be-processed near-infrared image.

In some alternative implementations of the present embodiment, the method may further include the step of setting a color for the second feature point.

The present disclosure achieves the direct acquisition of the near-infrared feature information from a near-infrared image. Generally, after acquiring the near-infrared feature information, other data processing on the near-infrared feature information is also required. In order to be applied to other data processing, it is also possible to set a color and the like for the second feature point.

Figure 3:
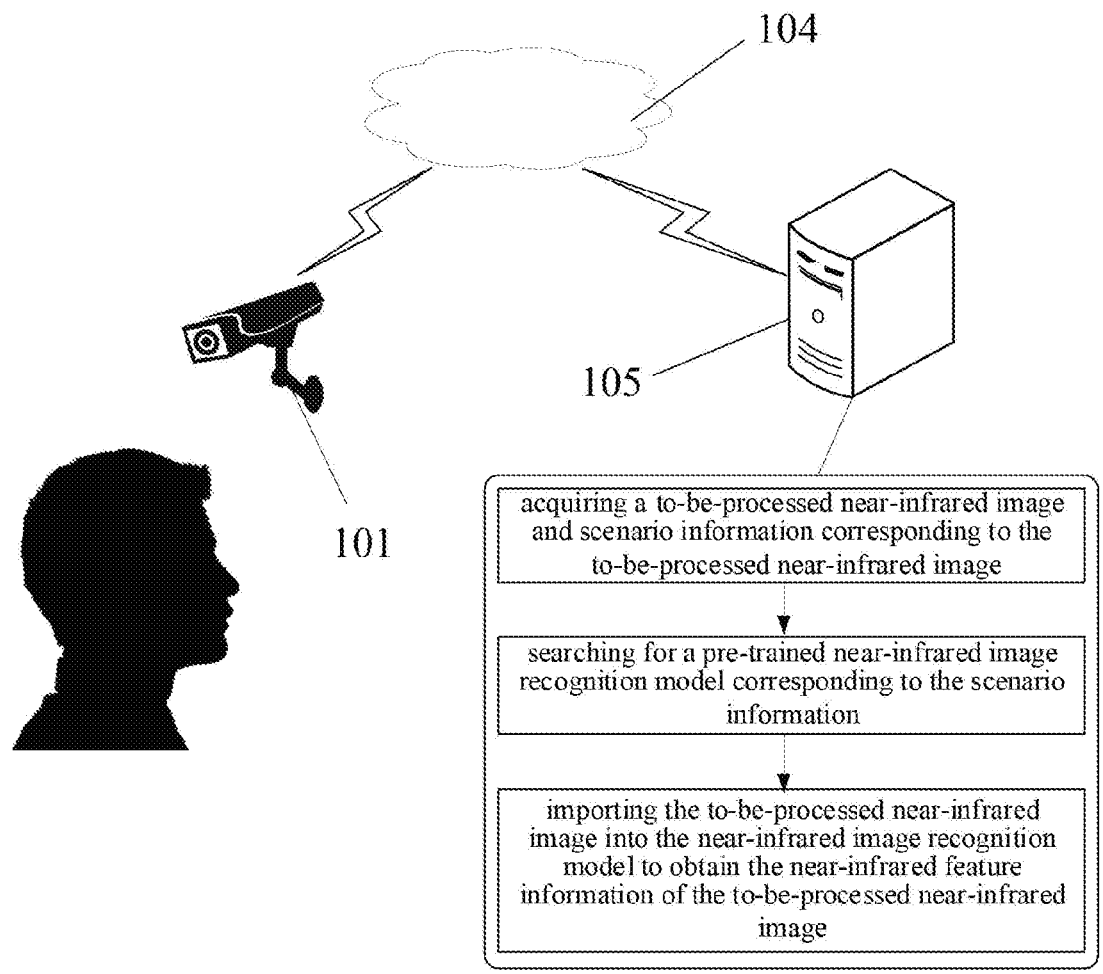
FIG. 3 is a schematic diagram of an application scenario of the method for acquiring information according to the present disclosure.

With further reference to FIG. 3, a schematic diagram of an application scenario of the method for acquiring information according to the present embodiment is illustrated. In the application scenario of FIG. 3, the terminal device 101 captures a to-be-processed near-infrared image, and then sends the to-be-processed near-infrared image to the server 105 through the network 104. After the server 105 acquires the to-be-processed near-infrared image and obtains scenario information corresponding to the to-be-processed near-infrared image, it searches for a pre-trained near-infrared image recognition model corresponding to the scenario information. Finally, the to-be-processed near-infrared image is imported into the near-infrared image recognition model to obtain the near-infrared feature information of the to-be-processed near-infrared image.

The method for acquiring information provided by the embodiments of the present disclosure, after acquiring a to-be-processed near-infrared image, directly imports the to-be-processed near-infrared image into a near-infrared image recognition model to obtain the near-infrared feature information, which speeds up the acquisition of the near-infrared feature information and improves the accuracy and efficiency of acquiring the near-infrared feature information.

Figure 4:
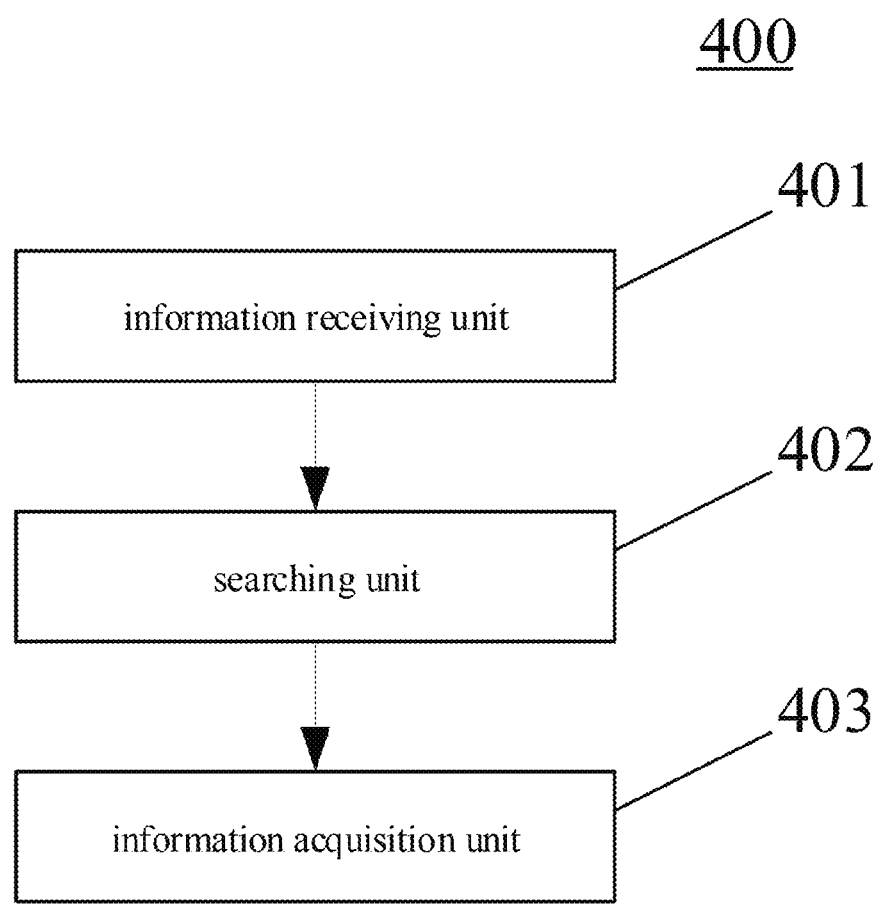
FIG. 4 is a schematic structural diagram of an embodiment of an apparatus for acquiring information according to the present disclosure.

With further reference to FIG. 4, as an implementation to the method shown in the above figures, the present disclosure provides an embodiment of an apparatus for acquiring information. The apparatus embodiment corresponds to the method embodiment shown in FIG. 2, and the apparatus may specifically be applied to various electronic devices.

As shown in FIG. 4, the apparatus 400 for acquiring information of the present embodiment may include: an information receiving unit 401, a searching unit 402 and an information acquisition unit 403. The information receiving unit 401 is configured to acquire a to-be-processed near-infrared image and scenario information corresponding to the to-be-processed near-infrared image, the scenario information being used to represent a scenario of acquiring the to-be-processed near-infrared image. The searching unit 402 is configured to search for a pre-trained near-infrared image recognition model corresponding to the scenario information, the near-infrared image recognition model being used to identify near-infrared feature information from the to-be-processed near-infrared image. The information acquisition unit 403 is configured to import the to-be-processed near-infrared image into the near-infrared image recognition model to obtain the near-infrared feature information of the to-be-processed near-infrared image.

In some alternative implementations of the present embodiment, the apparatus 400 for acquiring information may further include a near-infrared image recognition model construction unit (not shown in the figure), configured to construct the near-infrared image recognition model, and the near-infrared image recognition model construction unit may include: an image extraction subunit (not shown in the figure), an image converting subunit (not shown in the figure), a near-infrared relation pair acquisition subunit (not shown in the figure) and a near-infrared image recognition model construction subunit (not shown in the figure). The image extraction subunit is configured to extract a visible light image from a visible light image set, the visible light image including visible light feature information for describing a feature point on the visible light image. The image converting subunit is configured to convert the visible light image and the visible light feature information into a corresponding near-infrared image and near-infrared feature information respectively. The near-infrared relation pair acquisition subunit is configured to combine the near-infrared image and the near-infrared feature information into a near-infrared relation pair to obtain a set of near-infrared relation pairs corresponding to the visible light image set. The near-infrared image recognition model construction subunit is configured to train, by using a machine learning method, with the near-infrared image in the near-infrared relation pair as an input, and the near-infrared feature information in the near-infrared relation pair as an output, to obtain the near-infrared image recognition model.

In some alternative implementations of the present embodiment, the image converting subunit may include: a first feature point determination module (not shown in the figure), a second feature point determination module (not shown in the figure) and a near-infrared feature acquisition module (not shown in the figure). The first feature point determination module is configured to determine, on the visible light image, a first feature point corresponding to the visible light feature information. The second feature point determination module is configured to convert the visible light image into the near-infrared image to obtain a second feature point corresponding to the first feature point. The near-infrared feature information acquisition module is configured to determine corresponding feature information of the second feature point on the near-infrared image as near-infrared feature information of the near-infrared image, and the feature information including location and color.

In some alternative implementations of the present embodiment, the second feature point determination module may include: a first marking point setting submodule (not shown in the figure), a second marking point acquisition submodule (not shown in the figure) and a second marking point determination submodule (not shown in the figure). The first marking point setting submodule is configured to set a first marking point on the visible light image, the first marking point being used to mark a location of a first image contained in the visible light image. The second marking point acquisition submodule is configured to query a second marking point on the near-infrared image corresponding to the first marking point, the second marking point being used to mark a location of a second image contained in the near-infrared image corresponding to the first image. The second marking point determination submodule is configured to obtain the second feature point corresponding to the first feature point, in response to a location difference between the first marking point and the second marking point being less than a set threshold.

In some alternative implementations of the present embodiment, the apparatus 400 for acquiring information may further include a color setting unit, configured to set a color for the second feature point.

The present embodiment also provides a server, including: one or more processors; and a storage apparatus, for storing one or more programs, the one or more programs, when executed by the one or more processors, cause the one or more processors to implement the method for acquiring information.

The present embodiment also provides a computer readable storage medium, storing a computer program thereon, the program, when executed by a processor, implements the method for acquiring information.

Figure 5:
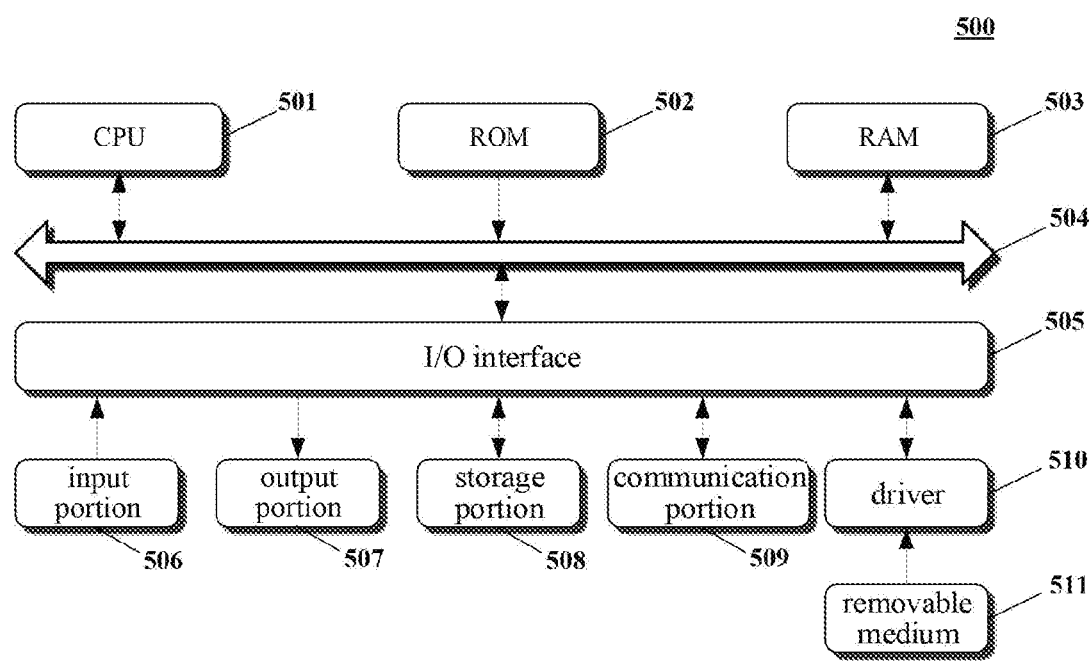
FIG. 5 is a schematic structural diagram of a computer system adapted to implement a server of the embodiments of the present disclosure.

Referring to FIG. 5, a schematic structural diagram of a computer system 500 adapted to implement a terminal device or a server of the embodiments of the present disclosure is shown. The server shown in FIG. 5 is merely an example and should bring no limitation on the functionality and the usage range of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an information receiving unit, a searching unit and an information acquisition unit, where the names of these units or modules do not in some cases constitute a limitation to such units or modules themselves. For example, the information acquisition unit may also be described as "a unit for acquiring near-infrared feature information."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a to-be-processed near-infrared image and scenario information corresponding to the to-be-processed near-infrared image, the scenario information being used to represent a scenario of acquiring the to-be-processed near-infrared image; search for a pre-trained near-infrared image recognition model corresponding to the scenario information, the near-infrared image recognition model being used to identify near-infrared feature information from the to-be-processed near-infrared image; and import the to-be-processed near-infrared image into the near-infrared image recognition model to obtain the near-infrared feature information of the to-be-processed near-infrared image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for acquiring information, the method comprising:
    acquiring a to-be-processed near-infrared image and scenario information corresponding to the to-be-processed near-infrared image, the scenario information being used to represent a scenario of acquiring the to-be-processed near-infrared image;
    searching for a pre-trained near-infrared image recognition model corresponding to the scenario information, the near-infrared image recognition model being used to identify near-infrared feature information from the to-be-processed near-infrared image; and
    importing the to-be-processed near-infrared image into the near-infrared image recognition model to obtain the near-infrared feature information of the to-be-processed near-infrared image,
    wherein the method comprises constructing the near-infrared image recognition model, and the constructing the near-infrared image recognition model comprises:
        extracting a visible light image from a visible light image set, the visible light image comprising visible light feature information for describing a feature point on the visible light image;
        converting the visible light image and the visible light feature information into a corresponding near-infrared image and near-infrared feature information respectively;
        combining the near-infrared image and the near-infrared feature information into a near-infrared relation pair to obtain a set of near-infrared relation pairs corresponding to the visible light image set; and
        training, by using a machine learning method, with the near-infrared image in the near-infrared relation pair as an input, and the near-infrared feature information in the near-infrared relation pair as an output, to obtain the near-infrared image recognition model.

2. The method according to claim 1, wherein the converting the visible light image and the visible light feature information into a corresponding near-infrared image and near-infrared feature information respectively, comprises:
    determining, on the visible light image, a first feature point corresponding to the visible light feature information;
    converting the visible light image into the near-infrared image to obtain a second feature point corresponding to the first feature point; and
    determining corresponding feature information of the second feature point on the near-infrared image as near-infrared feature information of the near-infrared image, and the feature information comprising a location and a color.

3. The method according to claim 2, wherein the converting the visible light image into the near-infrared image to obtain a second feature point corresponding to the first feature point, comprises:
    setting a first marking point on the visible light image, the first marking point being used to mark a location of a first image contained in the visible light image;
    querying a second marking point on the near-infrared image corresponding to the first marking point, the second marking point being used to mark a location of a second image contained in the near-infrared image and corresponding to the first image; and
    obtaining the second feature point corresponding to the first feature point, in response to a location difference between the first marking point and the second marking point being less than a set threshold.

4. The method according to claim 2, wherein the method further comprises setting a color for the second feature point.

5. An apparatus for acquiring information, the apparatus comprising:
    at least one processor; and
    a memory storing instructions, the instructions when executed by the at least one processor, cause the at least one processor to perform operations, the operations comprising:
    acquiring a to-be-processed near-infrared image and scenario information corresponding to the to-be-processed near-infrared image, the scenario information being used to represent a scenario of acquiring the to-be-processed near-infrared image;
    searching for a pre-trained near-infrared image recognition model corresponding to the scenario information, the near-infrared image recognition model being used to identify near-infrared feature information from the to-be-processed near-infrared image; and
    importing the to-be-processed near-infrared image into the near-infrared image recognition model to obtain the near-infrared feature information of the to-be-processed near-infrared image,
    wherein the operations comprise constructing the near-infrared image recognition model, and the constructing the near-infrared image recognition model comprises:
        extracting a visible light image from a visible light image set, the visible light image comprising visible light feature information for describing a feature point on the visible light image;
        converting the visible light image and the visible light feature information into a corresponding near-infrared image and near-infrared feature information respectively;
        combining the near-infrared image and the near-infrared feature information into a near-infrared relation pair to obtain a set of near-infrared relation pairs corresponding to the visible light image set; and
        training, by using a machine learning method, with the near-infrared image in the near-infrared relation pair as an input, and the near-infrared feature information in the near-infrared relation pair as an output, to obtain the near-infrared image recognition model.

6. The apparatus according to claim 5, wherein converting the visible light image and the visible light feature information into a corresponding near-infrared image and near-infrared feature information respectively comprises:
   determining, on the visible light image, a first feature point corresponding to the visible light feature information;
   converting the visible light image into the near-infrared image to obtain a second feature point corresponding to the first feature point; and
   determining corresponding feature information of the second feature point on the near-infrared image as near-infrared feature information of the near-infrared image, and the feature information comprising a location and a color.

7. The apparatus according to claim 6, wherein the converting the visible light image into the near-infrared image to obtain a second feature point corresponding to the first feature point, comprises:
   setting a first marking point on the visible light image, the first marking point being used to mark a location of a first image contained in the visible light image;
   querying a second marking point on the near-infrared image corresponding to the first marking point, the second marking point being used to mark a location of a second image contained in the near-infrared image corresponding to the first image; and
   obtaining the second feature point corresponding to the first feature point, in response to a location difference between the first marking point and the second marking point being less than a set threshold.

8. The apparatus according to claim 6, wherein the operations further comprise setting a color for the second feature point.

9. A non-transitory computer readable storage medium storing a computer program, wherein the computer program, when executed by a processor, cause the processor to perform operations, the operations comprising:
   acquiring a to-be-processed near-infrared image and scenario information corresponding to the to-be-processed near-infrared image, the scenario information being used to represent a scenario of acquiring the to-be-processed near-infrared image;
   searching for a pre-trained near-infrared image recognition model corresponding to the scenario information, the near-infrared image recognition model being used to identify near-infrared feature information from the to-be-processed near-infrared image; and
   importing the to-be-processed near-infrared image into the near-infrared image recognition model to obtain the near-infrared feature information of the to-be-processed near-infrared image,
   wherein the operations comprise constructing the near-infrared image recognition model, and the constructing the near-infrared image recognition model comprises:
      extracting a visible light image from a visible light image set, the visible light image comprising visible light feature information for describing a feature point on the visible light image;
      converting the visible light image and the visible light feature information into a corresponding near-infrared image and near-infrared feature information respectively;
      combining the near-infrared image and the near-infrared feature information into a near-infrared relation pair to obtain a set of near-infrared relation pairs corresponding to the visible light image set; and
      training, by using a machine learning method, with the near-infrared image in the near-infrared relation pair as an input, and the near-infrared feature information in the near-infrared relation pair as an output, to obtain the near-infrared image recognition model.

* * * * *